US006018664A

United States Patent [19]

Skarin

[11] Patent Number: 6,018,664

[45] Date of Patent: Jan. 25, 2000

[54] METHOD OF BALANCING AVAILABILITY OF COMMUNICATION LINKS IN COMMUNICATION SYSTEMS

[75] Inventor: Dean Thomas Skarin, Hawthorn Woods, Ill.

[73] Assignee: Motorola, Inc., Schaumburg, Ill.

[21] Appl. No.: 09/065,223

[22] Filed: Apr. 23, 1998

[51] Int. Cl.[7] .......... H04B 1/00

[52] U.S. Cl. .......... 455/453; 455/509

[58] Field of Search .......... 455/453, 450, 455/451, 452, 464, 509; 370/280, 294, 314, 321, 326, 337, 347, 459, 468

[56] References Cited

U.S. PATENT DOCUMENTS 5,249,223 9/1993 Vanacore .......... 379/221

5,745,853 4/1998 Hippelainen .......... 455/450

FOREIGN PATENT DOCUMENTS 0 399 612 11/1990 European Pat. Off. .......... H04M 1/72

96/34468 10/1996 WIPO .......... H04J 3/16

OTHER PUBLICATIONS

Personal Digital Cellular Telecommunication System, RCR STD–27D, Revision D, Jun. 27th 1995, pp. 39–120.

*Primary Examiner*—Reinhard J. Eisenzopf

*Assistant Examiner*—Makoto Aoki

*Attorney, Agent, or Firm*—Sayed Hossain Beladi

[57] ABSTRACT

A method of balancing availability of uplink (102) and downlink (101) frequency bandwidths includes determining a demand level for use of downlink (101) frequency bandwidth, and occupying artificially a portion of uplink (102) frequency bandwidth based on the demand level to balance the availability of the uplink (102) and downlink (101) frequency bandwidths. Occupying artificially a portion of uplink (102) frequency bandwidth includes limiting access to a plurality of uplink time slots in uplink (102) communication. Failure to receive a demand for originating a call on uplink (102) communication or a demand by at least one of a plurality of mobile stations to terminate its uplink (102) communication triggers occupying artificially a portion of uplink (102) frequency bandwidth.

6 Claims, 2 Drawing Sheets

METHOD OF BALANCING AVAILABILITY OF COMMUNICATION LINKS IN COMMUNICATION SYSTEMS

FIELD OF THE INVENTION

The present invention relates to communication systems and more particularly to a cellular communication system.

BACKGROUND OF THE INVENTION

A cellular communication system provides communication links between a number of mobile stations and a basestation. A communication link from a mobile station to a basestation is normally referred to as a uplink communication, and in the reverse direction, a downlink communication. Depending on the communication system standards, protocols and control, a number of unidirectional messages are communicated between the mobile stations and the basestation. These unidirectional messages are transmitted in predefined communication channels such as broadcast control channel, paging channel, and other similar types of channels. These unidirectional messages are not normally in response to uplink communications. Since uplink and downlink frequency bandwidths are nearly equal, an unbalanced availability of frequency bandwidths is created when the number of transmission of such unidirectional messages exceeds in one communication link direction than another.

Unbalanced availability of frequency bandwidths creates a problem of communication overload in the communication system. The maximum number of mobile stations that could access the communication system depends on the uplink communication frequency bandwidth. Similarly, the maximum number of mobile station that a basestation could respond to depends on the downlink communication frequency bandwidth. More mobile users may be originating calls on the uplink communication in the uplink frequency bandwidth than the available portion of the downlink frequency bandwidth can accommodate because of the unbalanced available frequency bandwidths. As a result, mobile users on the uplink communications on call originations may not receive a response on the downlink communication for a period of time because the responses may be queued in a processor until a portion of downlink frequency bandwidth becomes available. If the period for response exceeds a predetermined time out limit, the call origination fails to proceed. When downlink frequency bandwidth can not accommodate the down link communication responses, the uplink communications overloads the uplink communication frequency bandwidth.

Moreover, unbalance availability of downlink and uplink frequency bandwidths may be due to a processor with a limited processing power in the basestation. The limited processing power of the processor that processes the downlink communication messaging may not allow the full use of the downlink frequency bandwidth thus creating unbalance availability of downlink and uplink frequency bandwidths. For example, if a large number of mobile users initiate uplink communications on the uplink frequency bandwidth, the processor due to its limited processing power may not be able to process the downlink communication responses on a timely fashion. The uplink communications as a result overload the uplink communication frequency bandwidth. Untimely response to uplink communications leads to a time out failure of the uplink communications. Therefore, the limited processing power in the basestation creates a condition for unbalance availability of uplink and downlink frequency bandwidths.

Therefore, there is a need for a method of balancing availability of frequency bandwidths in uplink and downlink communications, and preventing overload condition of the uplink communications.

DETAILED DESCRIPTION OF THE PREFERRED EMBODIMENTS

Figure 1:
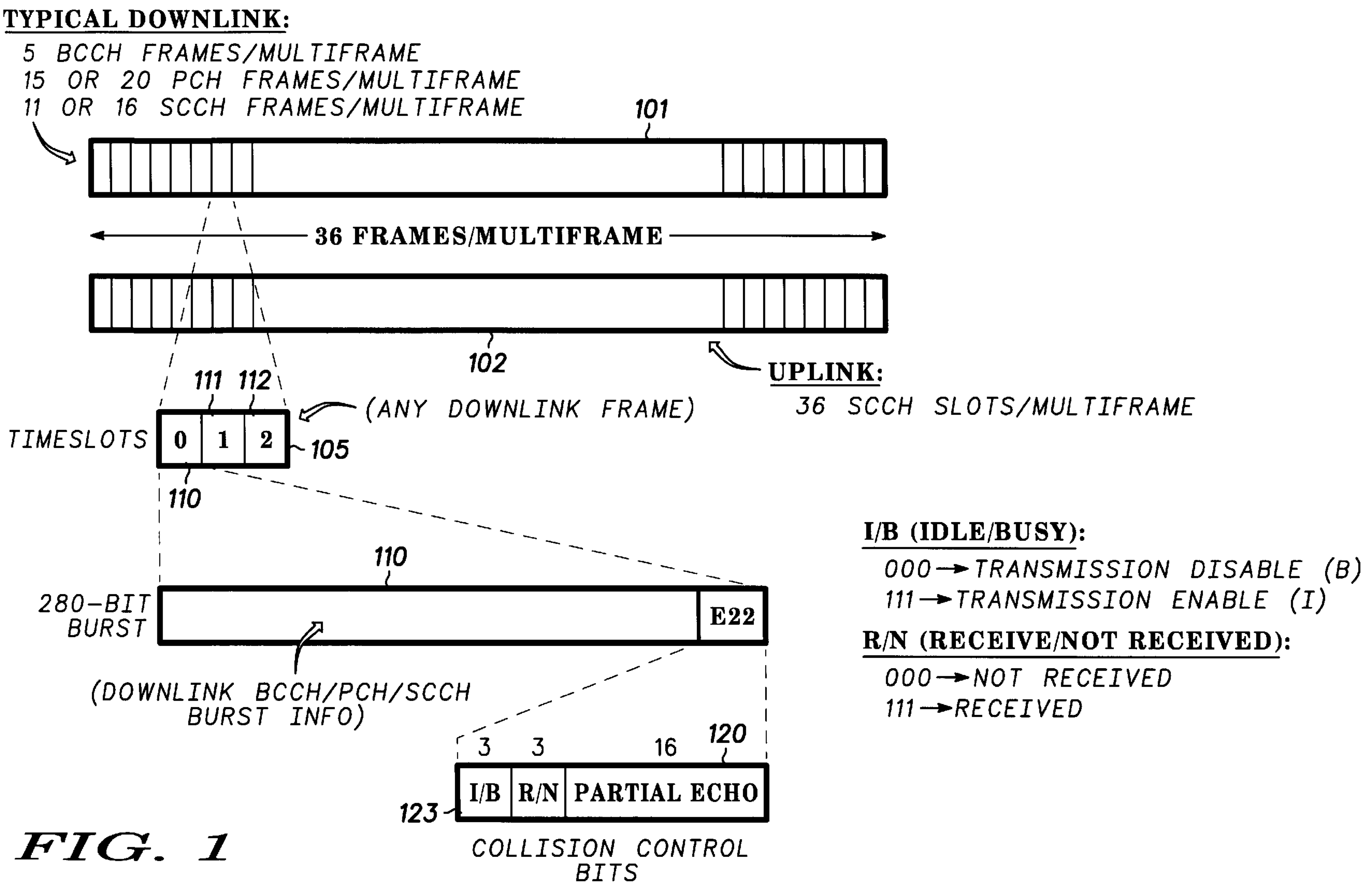
FIG. 1 depicts a PDC multiframe and various breakdown of its data fields.

A communication system provides uplink communications from a plurality of mobile stations to at least one basestation, and downlink communications from the basestation to at least one of the plurality of mobile stations. Such a communication system may be a cellular communication system. The uplink and downlink communications are in limited uplink and downlink frequency bandwidths. The downlink frequency bandwidth may nearly equal the uplink frequency bandwidth. A method of balancing availability of uplink and downlink frequency bandwidths includes determining a demand level for use of the limited downlink frequency bandwidth, and occupying artificially a portion of the limited uplink frequency bandwidth based on the demand level to balance the availability of the uplink and downlink frequency bandwidths. The downlink frequency bandwidth, as a result, has an available bandwidth that is sufficient for a timely use by all responses to all origination calls made on the uplink frequency bandwidth. The call origination will be completed without a time-out failure. Accordingly, when a mobile station makes its initial access to the basestation through the uplink communication, the mobile station is assured that a call origination will be completed.

To occupy artificially a portion of the uplink link frequency bandwidth without interrupting other calls in progress, the basestation monitors transmission of signals from the mobile stations. When the basestation fails to receive a demand for originating a call on the uplink communication, the failure to receive a signal triggers occupying artificially a portion of the limited uplink frequency bandwidth. In another situation, a demand by at least one of the plurality of mobile stations to terminate its ongoing uplink communication triggers occupying artificially a portion of the limited uplink frequency bandwidth. Accordingly, none of the calls in progress or any call origination is effected by occupying artificially a portion of the uplink frequency bandwidth.

In case the uplink communication is in a time division multiple access format which includes a plurality of uplink time slots, occupying artificially a portion of the limited uplink frequency bandwidth includes limiting access to a number of the plurality of uplink time slots. Some communication systems protocols, such as Personal Digital Cellular (PDC) Telecommunication System, allocates an idle-busy data field in each time slot to indicate busy or idle status of the time slot. A copy of PDC specification may be obtained by contacting Research and Development Center for Radio Systems, 1-5-16 Toranomon, Minato-ku, Tokyo 105 Japan. To artificially occupy a portion of the uplink frequency bandwidth by limiting access to the uplink time slots, idle-busy data field of at least one of the plurality of uplink time slots is set to busy status. The idle-busy data field may include one or more data bits. In case the idle-busy data field has been set to busy status from an ongoing call, the idle-busy status bit of the time slot is maintained in busy status after the ongoing call has been terminated.

To determine the demand level for downlink communication, in case the downlink communication is in a time division multiple access format which includes a plurality of downlink time slots, the demand level is based on an occupied number of the downlink time slots. Alternatively or additionally, the demand level is determined based on a number of the downlink time slots that are expected to be occupied.

In another embodiment of the invention, a communication system provides uplink communications from a plurality of mobile stations to at least one basestation, and downlink communications from the basestation to at least one of the plurality of mobile stations. The uplink and downlink communications are in limited uplink and downlink frequency bandwidths. A method of preventing uplink communication overload includes determining downlink communication load level, and occupying artificially a portion of the limited uplink frequency bandwidth based on the downlink communication load level to prevent uplink communication overload. The downlink communication load level is based on a number of responses in the downlink communications that are in response to a number of the plurality of mobile stations that are using the uplink communications. Alternatively or additionally, the downlink communication load level is based on a number of responses in the downlink communications that are in response to a number of the plurality of mobile stations that are expected to use the uplink communications. Alternatively or additionally, the load level is based on a processing power requirement of a number of responses in the downlink communications that are to be processed by a processor with a limited processing power. The occupying step is triggered when the processing power requirement exceeds, or nearly exceeds, the limited processing power. As a result, the uplink communication overload is prevented by limiting access to the uplink communication through occupying artificially a portion of the limited uplink frequency bandwidth when the number of messages in the downlink communication messaging exceeds the limited processing power of the processor. Therefore, all uplink communications are responded to in the downlink communications in a timely fashion by the processor.

In another embodiment of the invention, to prevent overload of uplink communications in a communication system, a method includes determining whether a load level of time division multiple access downlink communications in the communication systems exceeds a predetermined load level, and assigning a busy status to a time slot in a time division multiple access uplink communication when the load level exceeds the predetermined load level. As a result, uplink communications overload is prevented in the communication system. To facilitate implementation of such a method without interfering with other processes in the communication system, determination of the load level and assigning the busy status are performed every time a failure to receive a time division multiple access uplink communication is detected. Such a failure occurs when periodic search for signals from the mobile stations fails detecting any acceptable signal. Alternatively or additionally, determination of the load level and assignment of time slot busy status are performed when terminating a time division multiple access uplink communication. The assignment of the busy status to a time slot in a time division multiple access uplink communication may be in a form of maintaining an existing busy status associated with a uplink communication that is being terminated.

More specifically, in PDC communication system, the mobile station serves as the telecommunication terminal that enables a mobile user to make an uplink communication with a base station. The basestation provides a downlink communication to the mobile station. The functional structure of the radio frequency channels is divided over basically two types of communications, namely unidirectional and bi-directional. An example of unidirectional communication is a broadcast control channel (BCCH) that is used by the basestation through downlink communication to broadcast system control information such as location registration of the mobile stations. Another type of unidirectional channel is a paging channel (PCH) which allows transmission of information through downlink communication from a base station to mobile stations over a wide area. The most common bi-directional channel is a signaling control channel (SCCH) which is used for transmission of voice and data between the basestation and a mobile station through the uplink and downlink communications.

The communication structure of PDC is based on time division multiple access (TDMA). The downlink and uplink are provided with equal numbers and lengths of time slots. Each time slots is divided into a number of data fields. Each field carry a specific types of information. For example, a field is assigned to carry voice and data, another field to carry burst information, and another field to indicate busy or idle status of the slot.

Referring to FIG. 1, a PDC multiframe and various breakdown of its data fields are shown. A multiframe consists of 36 frames. The number of frames and length of each frame determines frequency bandwidth of uplink and downlink communications. A downlink multiframe 101, and uplink multiframe 102 have equal number of frames and identical length, therefore, the uplink and downlink communications have equal frequency bandwidths. According to PDC specification, downlink multiframe 101 typically dedicates five frames to BCCH, either 15 or 20 frames to PCH, and the remaining 11 or 16 frames to SCCH. Normally, the basestation responds to mobile stations on SCCH. On the uplink communications, all thirty six or majority of frames in the uplink multiframe 102 are available as SCCH. Since mobile stations originate calls on the available uplink frequency bandwidth, there are more frames available to mobile stations than the base station can respond to in its available SCCH frames on the down link communications. As a result, available frequency bandwidth on the uplink communication is higher than the available downlink frequency bandwidth.

Each frame, such as frame 105, is divided into three time slots, such as time slots 110, 111, and 112. Time slot 110, which is the first time slot in multiframe 105, has a collision control data field 120 that includes the time slot idle-busy status field 123. Status data field 123 consists of three data bits. To originate a call by a mobile station, the mobile station receives information from the basestation about the idle-busy status of time slot 110. The mobile station initiates its communication normally on the first slot of each frame, and acquires the busy-idle status of the first slot to find the availability of the bandwidth on the uplink communication. According to the invention, to occupy artificially a time slot in the uplink frequency bandwidth, the basestation assigns the busy-idle status data field 123 of that time slot to busy status. When the available uplink time slots are controlled by the basestation, the available uplink and downlink frequency bandwidths are balanced to account for unidirectional use of the downlink by PCH and BCCH.

Figure 2:
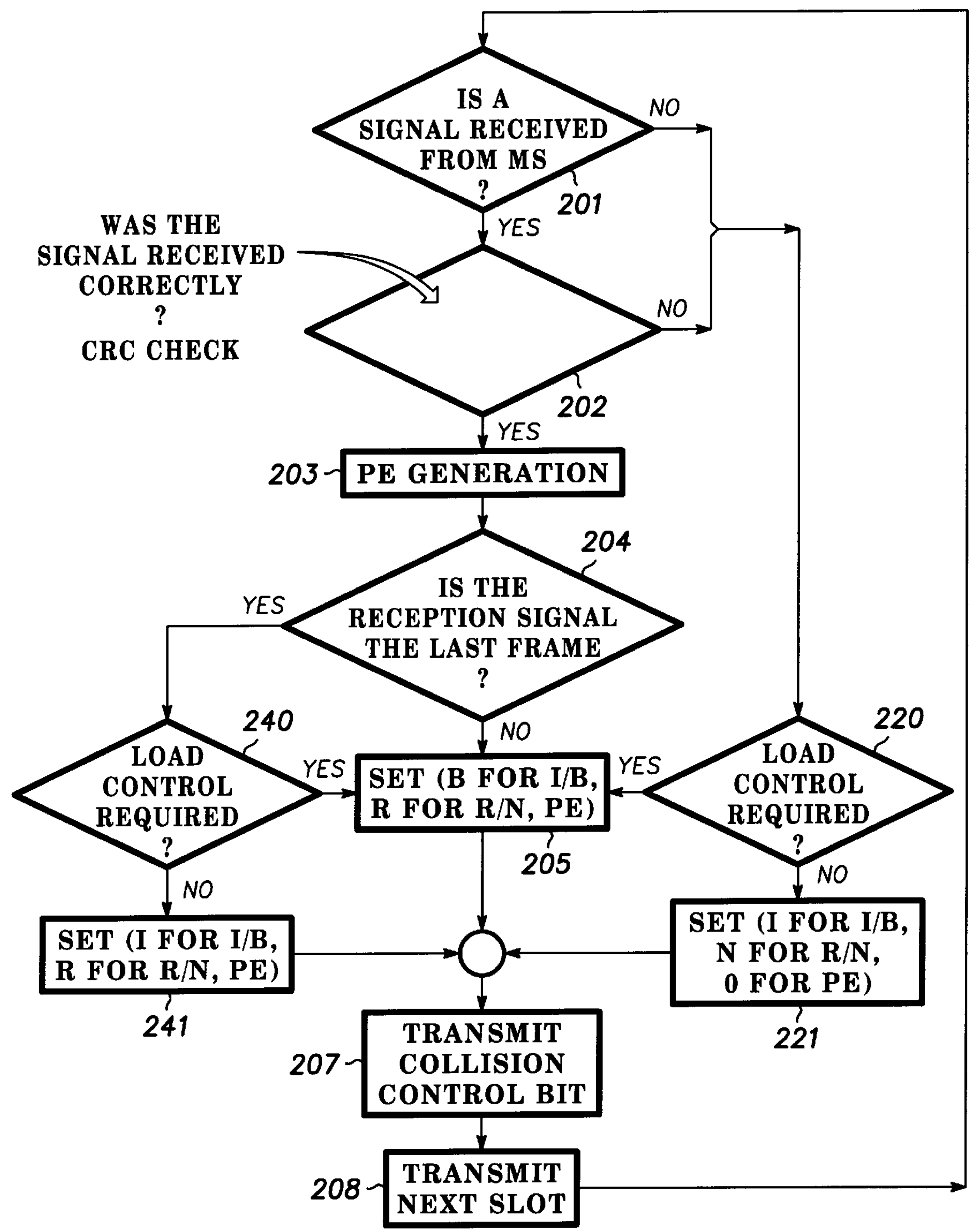
FIG. 2 depicts a transmission flow control at a basestation according to various embodiment of the invention.

Referring to FIG. 2, a transmission flow control at the basestation according to the invention is shown. At step 201, the basestation searches for signals transmitted from the mobile stations. If a signal is received at step 202, the basestation examines the received signal validity, and if an acceptable signal has been received, a partial echo (PE) at step 203 is generated for transmission. At step 204, the basestation determines whether the transmission from the mobile station is the last frame that will be received from the mobile station. If the transmission is not the last frame, the idle-busy status field is set to busy status at step 205. The basestation transmits collision control field 120 at step 207 when the next time slot is transmitted at step 208 in a downlink communication. If its idle-busy status data field has been set to busy status, The collision control field 120 is indicating that the subsequent frame from the frame which a signal was received at step 202 is being used by another mobile user. Subsequently, the basestation returns back to step 201 for searching signals transmitted from mobile stations.

If at steps 201 or 202 the signal fails to meet the minimum reception requirements, the basestation determines at step 220 whether the load level on the downlink communications exceeds a predetermined load level according to the invention. If the answer is positive, the basestation at step 205 sets idle-busy status data field 123 to busy status in transmission of next downlink time slot. If the determination at step 220 is negative, it does not effect idle-busy status data field 123. At step 204, if the frame received at step 201 is the last frame expected from a mobile station, the basestation determines at step 240 whether the load level on the downlink communications exceeds a predetermined load level according to the invention. If the answer is positive, the basestation at step 205 sets idle-busy status field 123 to busy status in transmission of next downlink time slot. If the determination at step 240 is negative, it does not effect idle-busy status data field 123. Accordingly, the basestation controls availability of uplink time slots such that the load level on the downlink communication is not exceeding a predetermined level.

The downlink frequency bandwidth, as a result, has an available bandwidth that is sufficient for a timely use by all responses to all origination calls made on the uplink multiframe 102. The call origination will be completed without a time-out failure. Also, none of the calls in progress or any call origination is effected by occupying artificially a portion of the uplink frequency bandwidth when the determination of load level is performed at steps 220 or 240, and subsequently assignment of busy status is performed at step 205.

The load level at step 220 or 240 may be based on a processing power requirement of the transmission control of the base station as depicted in FIG. 2 for responding to a number of responses in the downlink communications. The occupying step is triggered when the processing power requirement exceeds, or nearly exceeds, the limited processing power. As a result, the uplink communication overload is prevented by limiting access to the uplink communications through setting idle-busy status data field 123 to busy status. Therefore, all uplink communications are responded to in the downlink communications in a timely fashion, and occurrences of time-out failures have been prevented.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed:

1. In a communication system that provides uplink communications from a plurality of mobile stations to at least one basestation, and downlink communications from said basestation to at least one of said plurality of mobile stations, and said uplink and downlink communications are in limited uplink and downlink frequency bandwidths, a method comprising the steps of:

determining a demand level based on at least one of:

a number of required communication responses in said downlink communications that are in response to a number of said plurality of mobile stations using said uplink communications and/or expected to use said uplink communications, and a processing power requirement of said number of required communication responses by a processor in said basestation with a limited processing power;

occupying artificially a portion of said limited uplink frequency bandwidth based on said demand level thereby effecting at least one of preventing overload of said uplink bandwidth, and balancing availability of said uplink and downlink frequency bandwidths;

wherein said occupying step is triggered by:

absence of receiving at said basestation a demand for call origination on said uplink communications by at least one of said plurality of mobile stations, and when said processing power requirement nearly exceeds or approaches near said limited processing power.

2. The method as recited in claim 1 wherein said uplink communication is in a time division multiple access format including a plurality of uplink time slots, said occupying step comprises of limiting access to at least one of said plurality of uplink time slots.

3. The method as recited in claim 2 wherein said limiting step comprises of setting an idle-busy bit of said uplink time slots to a busy status.

4. The method as recited in claim 2 wherein said limiting comprises of maintaining a busy status of an idle-busy bit of said uplink time slots.

5. The method as recited in claim 1 wherein said downlink communication is in a time division multiple access format including a plurality of downlink time slots, said number of required communication responses is based on at least one of an occupied number of said plurality of downlink time slots, and an expected occupied number of said plurality of downlink time slots.

6. The method as recited in claim 1 wherein said communication system is a Personal Digital Cellular communication system.

* * * * *